United States Patent [19]

Ogawa et al.

[11] Patent Number: 4,739,812
[45] Date of Patent: Apr. 26, 1988

[54] PNEUMATIC TIRE TREAD WITH RECESSED SHOULDER PORTION

[75] Inventors: Hiroshi Ogawa; Kenichi Motomura, both of Higashiyamato; Yukimasa Yamada, Kodaira; Mamoru Mamada, Kodaira; Hikaru Tansei, Kodaira, all of Japan

[73] Assignee: Bridgestone Corporation, Tokyo, Japan

[21] Appl. No.: 850,694

[22] Filed: Apr. 11, 1986

[30] Foreign Application Priority Data

Apr. 12, 1985 [JP] Japan .................................. 60-78109

[51] Int. Cl.⁴ .............................................. B60C 11/04
[52] U.S. Cl. ................................................ 152/209 R
[58] Field of Search ......................... 152/209 R, 209 D

[56] References Cited

U.S. PATENT DOCUMENTS

| | | | |
|---|---|---|---|
| 3,949,797 | 4/1976 | Mirtain ............................ | 152/209 R |
| 3,976,115 | 8/1976 | Mirtain et al. ................... | 152/209 R |
| 4,262,722 | 4/1981 | Takigawa et al. ............... | 152/209 R |
| 4,282,914 | 8/1981 | Takigawa et al. ............... | 152/209 R |
| 4,353,402 | 10/1982 | Burche et al. .................. | 152/209 R |

Primary Examiner—Michael Ball
Attorney, Agent, or Firm—Cushman, Darby & Cushman

[57] ABSTRACT

A pneumatic tire comprising a tread divided into at least three ribs by at least two main wide grooves substantially extending in a circumferential direction of the tire, wherein a shoulder rib of the ribs arranged at an outermost end portion of the tread is divided in an axial direction parallel to an axis of rotation of the tire into at least two rib portions; and between two adjacent rib portions of the rib portions, an inner end of an outer surface of an outer rib portion is connected through an outer surface of a circumferentially extending sloped portion to an outer end of an outer surface of an inner rib portion so that the outer end of the outer surface of the outer rib portion is lower than the inner end of the outer surface of the inner rib portion.

23 Claims, 9 Drawing Sheets

PNEUMATIC TIRE TREAD WITH RECESSED SHOULDER PORTIONFIELD OF THE INVENTION

The present invention relates in general to pneumatic tires operated at high speed on smooth surface roadways and in particular to an improvement in configuration of the tread of pneumatic radial tires which are employed in heavy-duty road vehicles such, for example, as trucks, buses and like vehicles

SUMMARY OF THE INVENTION

In accordance with one important aspect of the present invention, there is provided a pneumatic tire comprising a tread divided into at least three ribs by at least two main wide grooves substantially extending in a circumferential direction of the tire, wherein a shoulder rib of the ribs arranged at an outermost end portion of the tread is divided in an axial direction parallel to an axis of rotation of the tire into at least two rib portions; and between two adjacent rib portions of the rib portions, an inner end of an outer surface of an outer rib portion is connected through an outer surface of a circumferentially extending sloped portion to an outer end of an outer surface of an inner rib portion so that the inner end of the outer surface of the outer rib portion is lower than the outer end of the outer surface of the inner rib portion.

In accordance with another important aspect of the present invention, there is provided a pneumatic tire comprising a tread divided into at least three ribs by at least two main wide grooves substantially extending in a circumferential direction of the tire, wherein a shoulder rib of the ribs arranged at an outermost end portion of the tread which is divided in an axial direction parallel to an axis of rotation of the tire into at least two shoulder rib portions; between two adjacent shoulder rib portions of the shoulder rib portions, an inner end of an outer surface of an outer shoulder rib portion is connected through an outer surface of a circumferentially extending sloped portion to an outer end of an outer surface of an inner shoulder rib portion so that the inner end of the outer surface of the outer shoulder rib portion is lower than the outer end of the outer surface of the inner shoulder rib portion; and a plurality of sipes are formed in the vicinity of an outer end of at least one of the shoulder rib portions other than an outermost shoulder rib portion.

In accordance with still another important aspect of the present invention, there is provided a pneumatic tire comprising a tread divided into at least three ribs by at least two main wide grooves substantially extending in a circumferential direction of the tire, wherein a shoulder rib of the ribs arranged at an outermost end portion of the tread is divided in an axial direction parallel to an axis of rotation of the tire into at least three shoulder rib portions; between two adjacent shoulder rib portions of the shoulder rib portions, an inner end of an outer surface of an outer shoulder rib portion is connected through an outer surface of a circumferentially extending sloped portion to an outer end of an outer surface of the inner shoulder rib portion so that the inner end of the outer surface of the outer shoulder rib portion is lower than the outer end of the outer surface of the inner shoulder rib portion; and a plurality of sipes are formed in the vicinities of outer ends of at least two of the shoulder rib portions other than an outmost shoulder rib portion, the sipes being gradually reduced in quantity axially inwardly of the tread.

Local wear is caused to occur in the outer end portion of the shoulder rib arranged at the outermost end portion of the tread by lateral force produced during turning of the vehicle and by drag produced during straight drive of the vehicle due to the difference in radius between the outer end portion and central portion of the tread. The local wear then extends from the outer end portion of the shoulder rib in the circumferential direction, in the axial inward direction and in the depth direction, and finally grows to various uneven wears. The "outer" used herein is intended to mean a direction going from the central portion of the tread to one of the lateral edges of the tread, and the "inner" is intended to mean a direction going from one of the lateral edges of the tread to the central portion of the tread.

According to the first invention, the aforementioned local wear is effectively prevented from occurring in the shoulder rib and from axially inwardly extending therefrom, and wear on the tread is evenly distributed, by axially dividing the tread into at least two rib portions through the circumferentially extending sloped portion. That is, between two adjacent rib portions, the inner end of the outer surface of the outer rib portion is connected through the outer surface of the circumferentially extending sloped portion to the outer end of the outer surface of the inner rib portion so that the inner end of the outer surface of the outer rib portion is lower than the outer end of the outer surface of the inner rib portion. For this reason, when the lateral force is exerted upon the tread, so-called ground-contact pressure acting on the outer rib portion of the shoulder rib, particularly on the shoulder rib end, is properly reduced and evenly distributed over the shoulder rib. As a consequence, the local wear is effectively prevented from occurring in the shoulder rib and from axially inwardly extending therefrom, and wear on the tread is evenly distributed. The "axially inwardly" used herein is intended to mean a direction that is parallel to the axis of rotation of the tire and going from one of the lateral edges of the tread to the central portion of the tread, and "axially outwardly" is intended to mean a direction that is opposite of axially inwardly.

According to the second invention, a plurality of sipes, in addition to the particular feature of the first invention, are provided in the vicinity of the outer end of at least one rib portion other than an outermost rib portion. For this reason, since the rigidity of the outer end portion of the shoulder rib is decreased, the local wear is more effectively prevented from extending in the circumferential and axial inward directions. Further, new local wear is prevented from occurring in the outer end portion of the inner rib portion.

According to the third invention, the sipes, in addition to the particular feature of the second invention, are gradually reduced in quantity axially inwardly of the tread. This is because that the lateral force, which causes the uneven wear, is larger in the outer end portion of the tread. Thus, the uneven wear is still more effectively prevented from extending axially inwardly of the shoulder rib.

BRIEF DESCRIPTION OF THE DRAWINGS

The drawbacks of the tread of a prior art tire and the features and advantages of the tread of a pneumatic tire according to the present invention will be more clearly understood from a consideration of the following detailed description in conjunction with the annexed drawings in which.

DESCRIPTION OF THE PRIOR ART

So-called complete rib type, rib-lug type, and rib-block type are well known as a tread pattern or configuration of pneumatic tires chiefly operated at high speed on smooth surface roadways. The tread of such types is axially divided by two to five or more wide grooves substantially extending in the circumferential direction of the tire, and is formed with a plurality of circumferentially extending land portions (which will hereinafter be referred to as "ribs", including the case that the land portions are further divided in the circumferential direction by axially extending grooves).

However, the pneumatic tires of such tread patterns have some serious drawbacks. For example, there was the drawback that various uneven wears occur in each rib of the tread, particularly in the opposite shoulder ribs arranged at the axially outermost end portions of the tread.

Figure 9A:
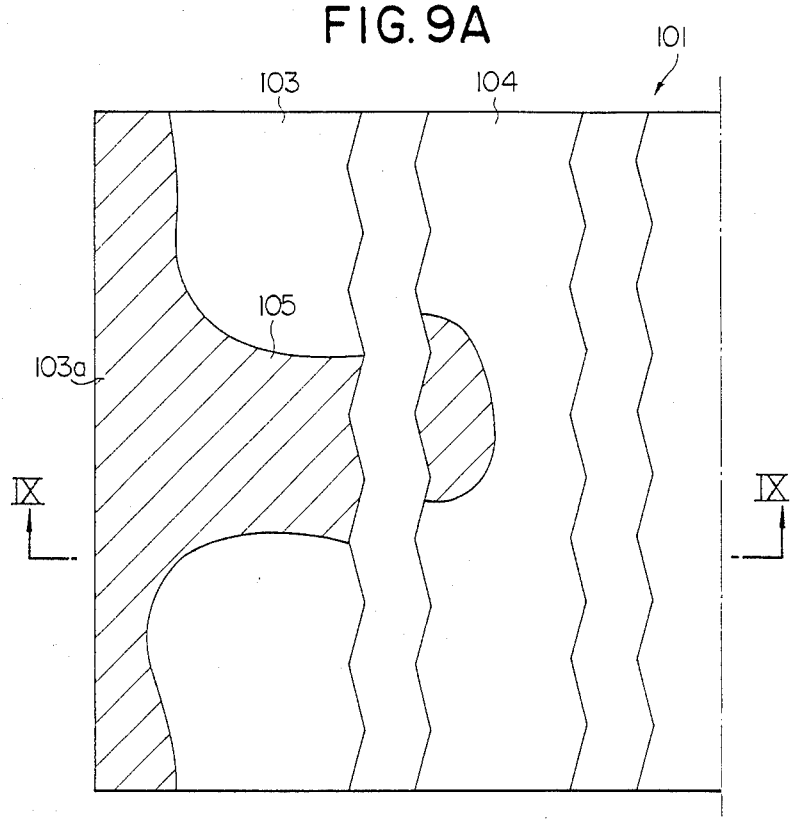
FIG. 9A is a part-plan view of the tread of the prior art tire.
Figure 9B:
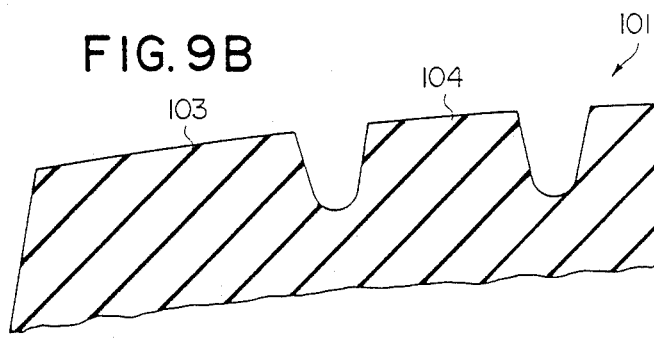
FIG. 9B is a cross sectional view of the tread substantially taken along line IX—IX indicated in FIG. 9A.

Although these uneven wears vary with the operating condition, operating period, etc., of the tire, the wear as shown in FIGS. 9A and 9B is a representative uneven wear. The wear occurred in the axially outermost end portion 103a of a shoulder rib 103 of a tread 101 unevenly extends axially inwardly of the tread 101. In a particular case, the local wear extends beyond the shoulder rib 103 and to a rib 104 arranged axially inwardly of the tread 101, and finally grows as indicated by oblique lines in FIG. 9A (this uneven wear is normally called an undulant wear because the outer surface of the shoulder rib undulates when the tire is viewed from the axial direction thereof).

Such uneven wear considerably impairs appearance of the tire, and causes the tire to vibrate, thereby resulting in deterioration in performance of the tire itself. Thus, the life of the tire is considerably decreased.

It is, accordingly, an important object of the present invention to provide an improved pneumatic tire which can overcome the uneven wear, thereby considerably improving the life of the tire.

DESCRIPTION OF THE PREFERRED EMBODIMENTS

Figure 1A:
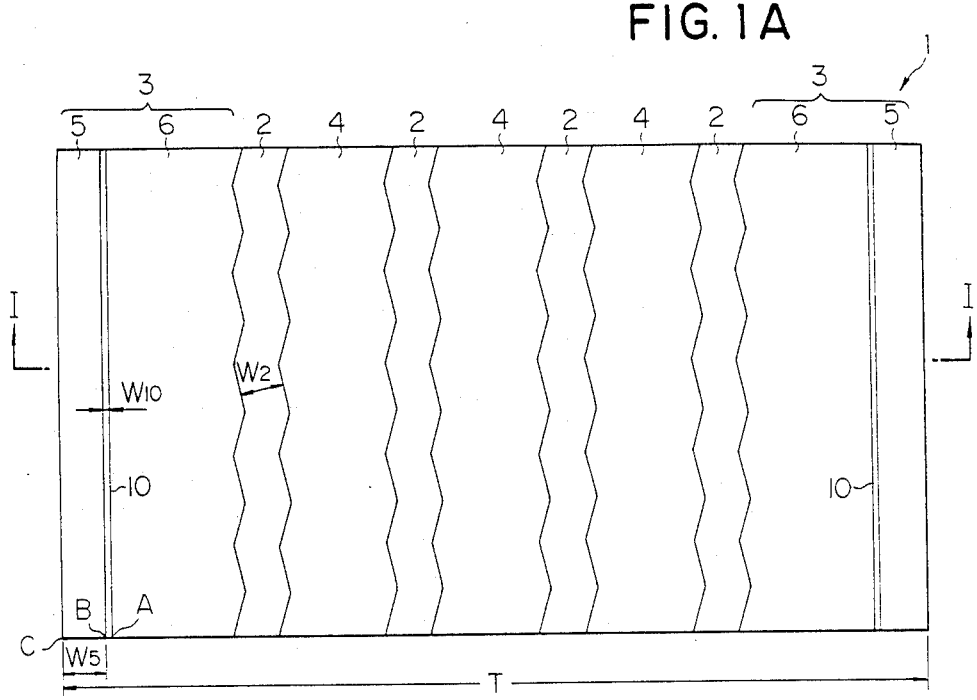
FIG. 1A is a part-plan view of the tread of a pneumatic radial tire according to a first embodiment of a first invention.
Figure 1B:
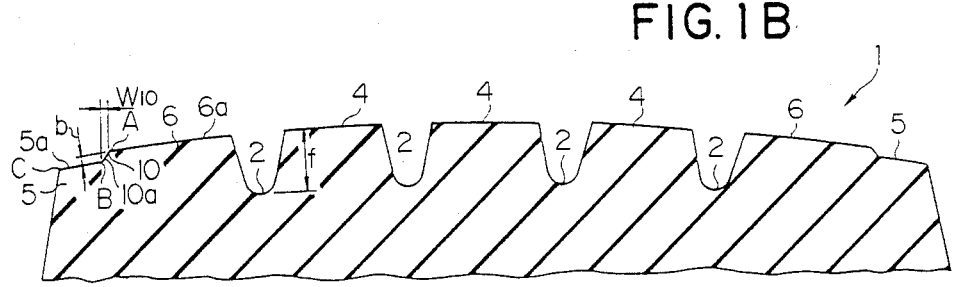
FIG. 1B is a cross sectional view of the tread substantially taken along line I—I indicated in FIG. 1A.

Referring initially to FIGS. 1A and 1B of the annexed drawings, a tread of a pneumatic radial tire constructed in accordance with a first embodiment of a first invention is generally designated by reference numeral 1. The pneumatic radial tire is well known which comprises a carcass ply containing cords arranged in parallel with the radial direction of the tire and a plurality of belts arranged at a crown portion of the tire and superimposed about the carcass ply, the belts having a high rigidity in the circumferential direction of the tire. Thus, the description of the internal construction will hereinafter be omitted.

The tread 1 according to the present invention is axially divided into at least three ribs by at least two main wide grooves substantially extending in the circumferential direction of the tire. A shoulder rib of the ribs arranged at the axially outermost end portion of the tread is further axially divided into at least two rib portions. In the first embodiment, the tread 1 is divided into five ribs 3 and 4 by four main grooves 2 extending in zigzag fashion in the circumferential direction of the tire. The opposite shoulder ribs 3 and 3, which are arranged at the axially outermost end portions of the tread 1, are each axially divided into an outer rib portion 5 and an inner rib portion 6 through a circumferentially extending sloped portion 10. The sloped portion may extend in zigzag fashion in the circumferential direction of the tire.

As shown in FIGS. 1A and 1B, an inner end B of an outer surface 5a of the outer rib portion 5 is connected through an outer surface 10a of the circumferentially extending sloped portion 10 to an outer end A of an outer surface 6a of the inner rib portion 6 so that the inner end B of the outer surface 5a of the outer rib portion 5 is lower than the outer end A of the outer surface 6a of the inner rib portion 6.

Thus, since the inner end B of the outer surface 5a of the outer rib portion 5 is lower than the inner end A of the outer surface 6a of the inner rib portion 6, the local wear which occurs in the vicinity of the outer end of the shoulder rib 3 is effectively prevented from extending therefrom axially inwardly of the tread 1.

It is noted that each main groove 2 is constructed not so as to be closed in the region of the tread 1 contacted with the ground during cruising of the vehicle upon load, preferably the width $W_2$ thereof being from 4 to 8% of the tread width T of the tread 1. This construction of the main groove 2 is common to all cases which will hereinafter be described.

In FIG. 1A, a width $W_5$ of the outer rib portion 5 of the shoulder rib 3, viz., a width measured in the axial direction between the opposite ends B and C, is preferably from 2 to 15% of the tread width T, more preferably from 3 to 10%. A height b of the sloped portion 10, viz., a height measured in the radial direction of the tire between the outer end A of the outer surface 6a of the inner rib portion 6 and the inner end B of the outer surface 5a of the outer rib portion 5, is preferably from 0.1 to 4% of the tread width T of the tread 1, more preferably from 0.2 to 2%. A width $W_{10}$, measured in the axial direction, of the sloped portion 10 is preferably from 0 to 5% of the tread width T, more preferably from 0 to 3%.

Figure 2A:
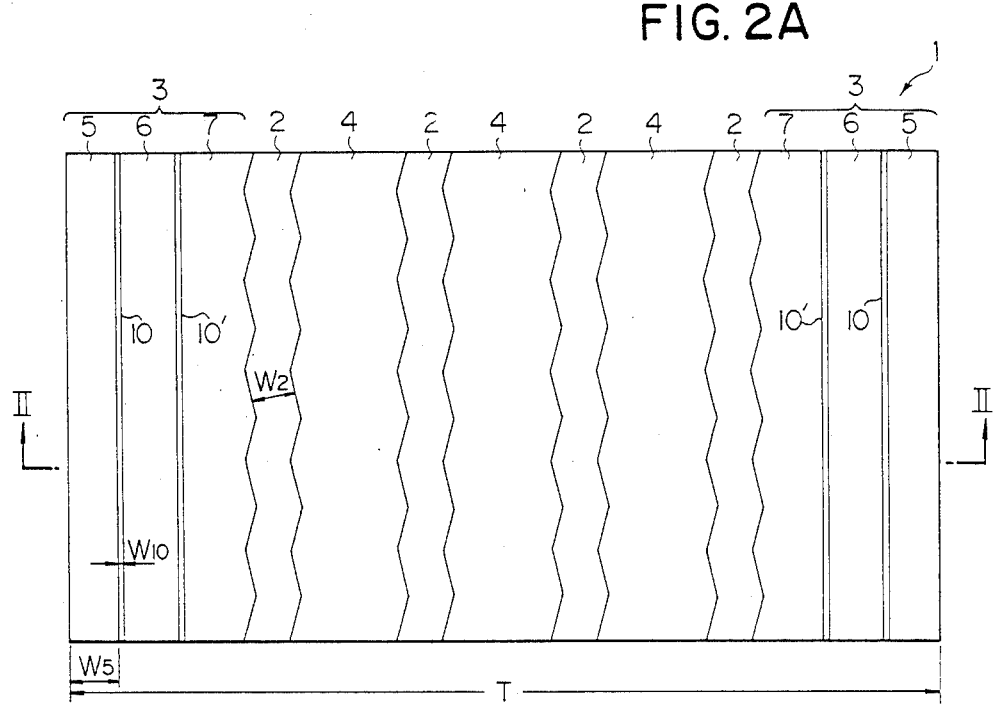
FIG. 2A is a part-plan view of the tread of a pneumatic radial tire according to a second embodiment of the first invention.
Figure 2B:
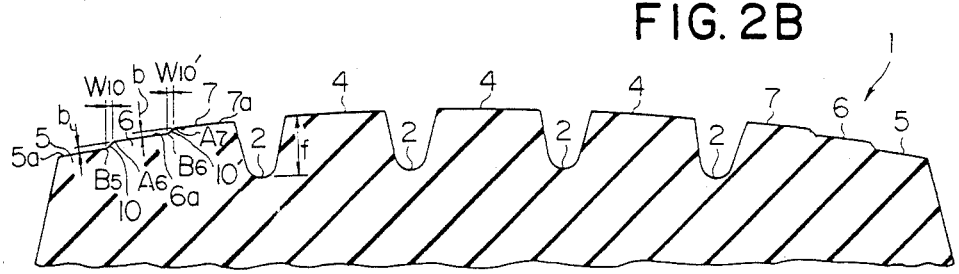
FIG. 2B is a cross sectional view of the tread substantially taken along line II—II indicated in FIG. 2A.

FIGS. 2A and 2B show a tread pattern of a pneumatic tire constructed in accordance with a second embodiment of the first invention. In this second embodiment, the shoulder rib 3 in the first embodiment as shown in FIGS. 1A and 1B is axially divided into an outermost rib portion 5, an intermediate rib portion 6 and an innermost rib portion 7. As described in the first embodiment, for the purpose of preventing the occurrence of the local wear, an inner end $B_5$ of an outer surface 5a of the outermost rib portion 5 is connected through a first circumferentially extending sloped portion 10 to an outer end $A_6$ of an outer surface 6a of the intermediate rib portion 6 so that the inner end B of the outer surface 5a of the outer rib portion 5 is lower than the outer end A of the outer surface 6a of the inner rib portion 6. An inner end $B_6$ of an outer surface 6a of the intermediate rib portion 6 is connected through a second circumferentially extending sloped portion 10' to an outer end $A_7$ of an outer surface 7a of the innermost rib portion 7 so that the inner end $B_6$ of the outer surface 6a of the outer rib portion 6 is lower than the outer end $A_7$ of the outer surface 7a of the innermost rib portion 7. The portions of the tread substantially identical in construction and operation to those of the first embodiment of the first invention are designated by like reference numerals and therefore the description thereof will hereinafter be omitted.

Figure 3A:
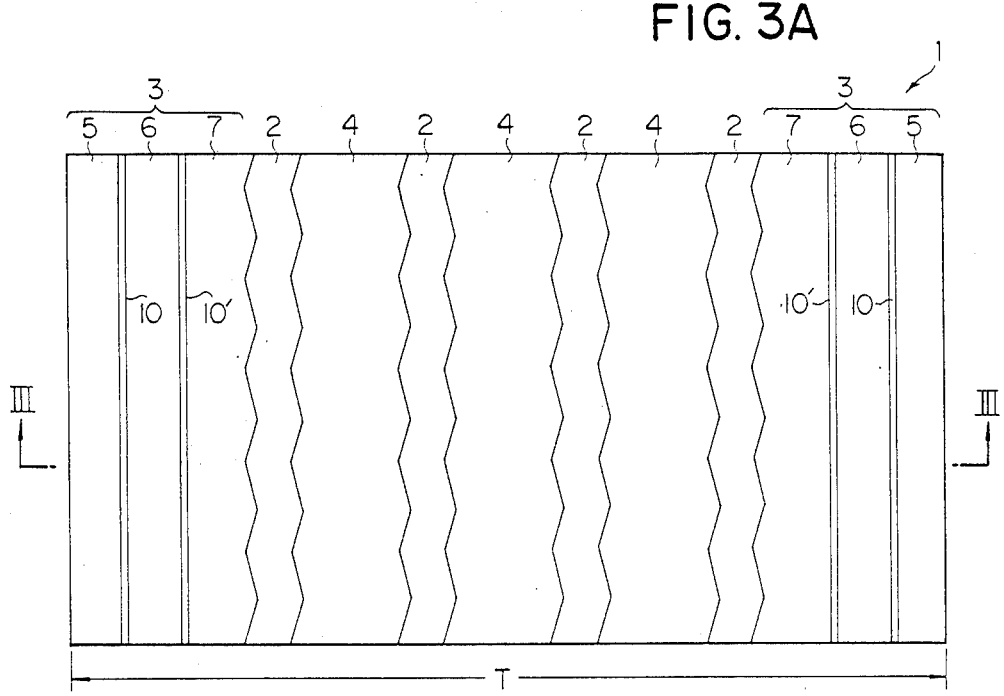
FIG. 3A is a part-plan view of the tread of a pneumatic radial tire according to a third embodiment of the first invention.
Figure 3B:
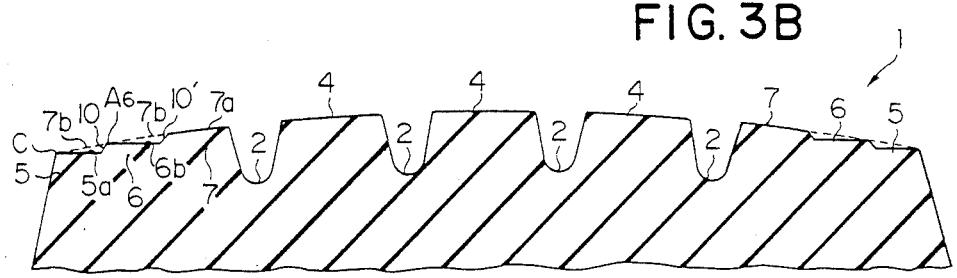
FIG. 3B is a cross sectional view of the tread substantially taken along line III—III indicated in FIG. 3A.

FIGS. 3A and 3B shown a tread pattern of a pneumatic tire constructed in accordance with a third embodiment of the first invention. This third embodiment is substantially identical in construction and operation to the first embodiment, except that the shoulder rib 3 in the first embodiment is axially divided into three rib portions 5, 6 and 7, and is substantially identical in construction and operation to the second embodiment, except that outer ends C and $A_6$ of outer surfaces 5a and 6a of the outer rib portions 5 and 6, respectively, are raised so as to be located on an extension line 7b of an outer surface 7a of the innermost rib portion 7. Thus, the description of the portions of the tread substantially identical to those of the first and second embodiments will hereinafter be omitted by designating like reference numerals.

Figure 4A:
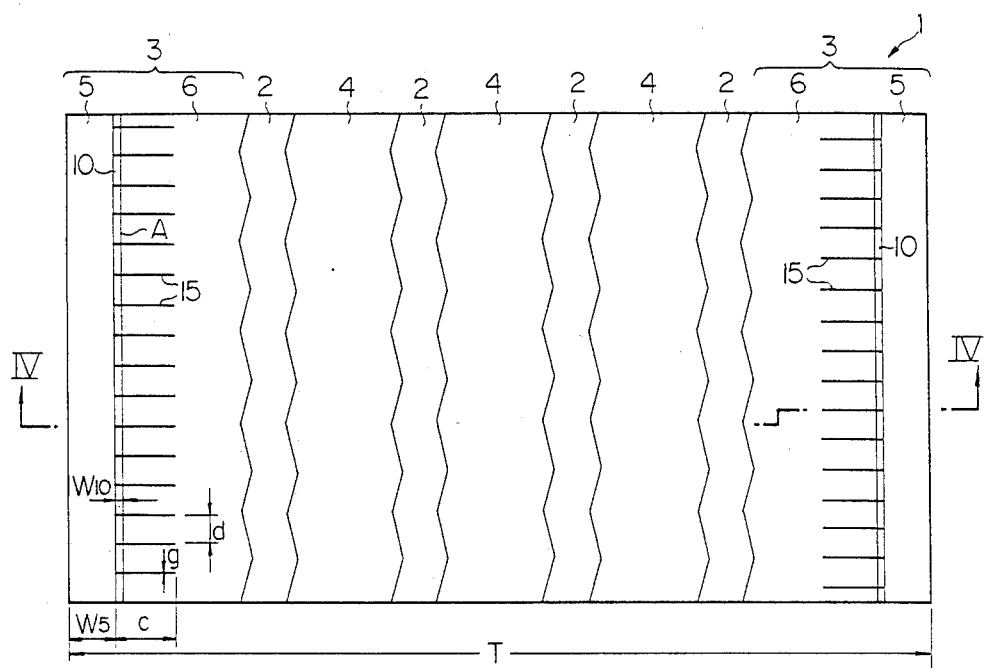
FIG. 4A is a part-plan view of the tread of a pneumatic radial tire according to a first embodiment of a second invention.
Figure 4B:
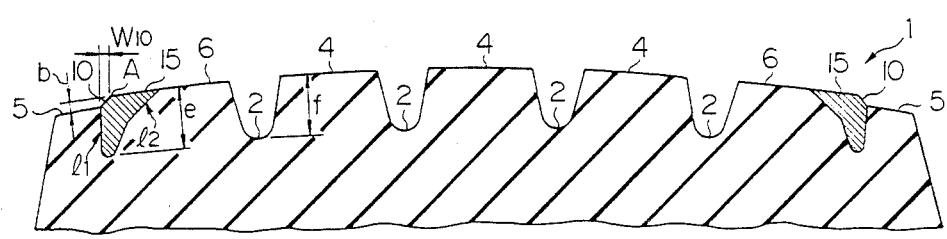
FIG. 4B is a cross sectional view of the tread substantially taken along line IV—IV indicated in FIG. 4A.

FIGS. 4A and 4B show a tread pattern of a pneumatic radial tire constructed in accordance with a first embodiment of a second invention. The portions of the tread substantially identical in construction and operation to those of the first invention hereinbefore described are designated by like reference numerals for avoiding the description thereof, and the only necessary part will hereinafter be described.

Shoulder ribs 3 and 3 arranged at the opposite outermost end portions of the tread 1 are each axially divided into at least two rib portions. In this first embodiment of the second invention, the shoulder rib 3 is axially divided into outer and inner rib portions 5 and 6 which are connected through a circumferentially extending sloped portion 10 with each other. For the purpose of effectively preventing the local wear occurred in the outer rib portion 5 from extending to the inner rib portion 6, a plurality of axially extending sipes or incisions 15 (which are indicated by oblique lines in FIG. 4B) are formed in the vicinity of an outer end of the inner rib portion 6 so that the rigidity of the outer end portion of the inner rib portion 6 is decreased. As shown in FIGS. 4A and 4B, the sipes 15 are circumferentially spaced apart a small space d from one another and are substantially vertically incised with respect to the outer surface of the tread 1.

A length c, measured axially of the tread on the tread surface, of the sipe 15 is preferably not less than 1% of the tread width T, more preferably not less than 2%. The sipe 15 may also extend through the inner rib portion 6.

A depth e, measured in the radial direction of the tire, of the sipe 15 is preferably from 40 to 100% of the depth f of the outermost main groove 2, more preferably from 60 to 100%. In addition, as shown in FIG. 4B, the sipe 15 is desired to have a generally triangular cross section the outer side $1_1$ of which is substantially parallel to the radial direction of the tire and the inner side $1_2$ of which is gradually reduced axially inwardly in depth.

The space d, measured in the circumferential direction of the tire, of the sipe 15 is preferably from 2 to 10% of the tread width T, more preferably from 2.5 to 8%.

A width g of the sipe 15 is at least a width necessary for being substantially closed in the region of the tread contacted with the ground during cruising of the vehicle upon load, preferably from 0.3 to 1.5 mm. This width g is common to all cases which will hereinafter be described.

Figure 5A:
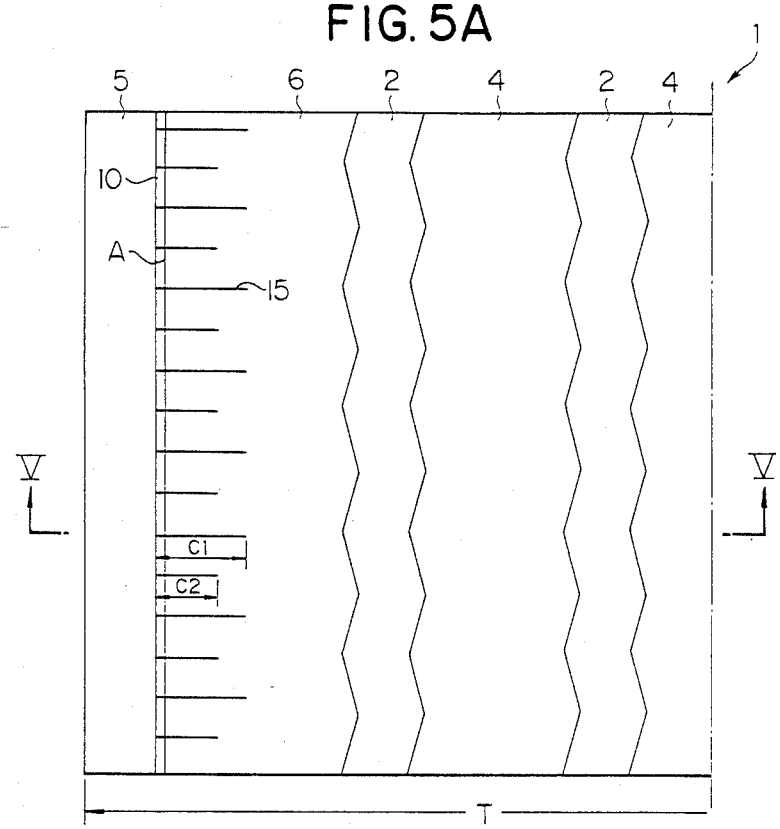
FIG. 5A is a part-plan view of the tread of a pneumatic radial tire according to a second embodiment of the second invention.
Figure 5B:
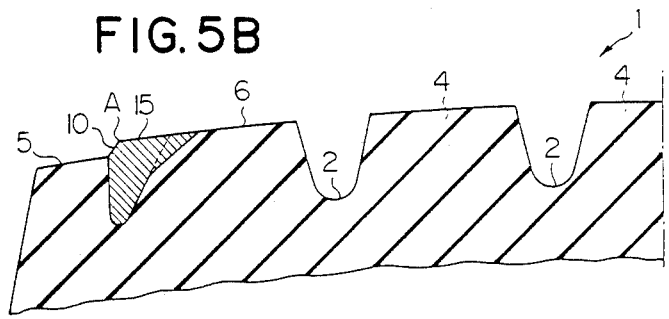
FIG. 5B is a cross sectional view of the tread substantially taken along line V—V indicated in FIG. 5A.

FIGS. 5A and 5B show a tread pattern of a pneumatic tire constructed in accordance with a second embodiment of the second invention. The portions of the tread substantially identical in construction and operation to those of the first embodiment of the second invention are designated by like reference numerals for avoiding the description thereof, and the only necessary part will hereinafter be described.

In this second embodiment, although a plurality of sipes 15 are also provided in the vicinity of an outer end A of an inner rib portion 6, the sipes 15 differ from those of the first embodiment in that they have different lengths $c_1$ and $c_2$.

Figure 6A:
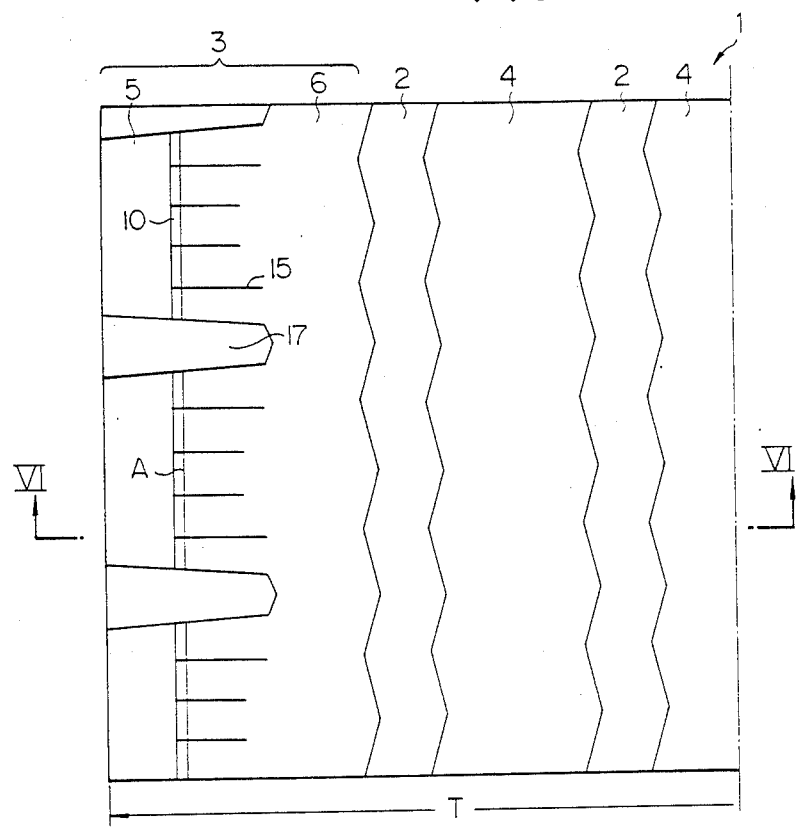
FIG. 6A is a part-plan view of the tread of a pneumatic radial tire according to a third embodiment of the second invention.
Figure 6B:
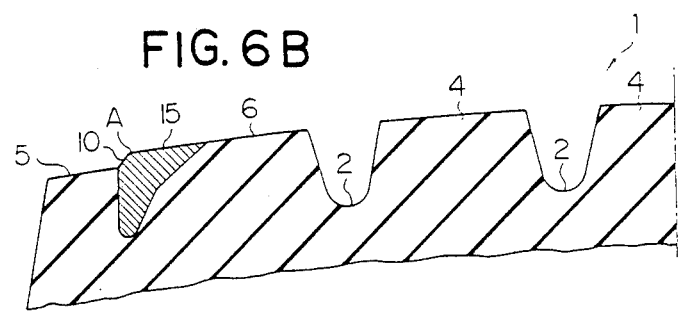
FIG. 6B is a cross sectional view of the tread substantially taken along line VI—VI indicated in FIG. 6A.

FIGS. 6A and 6B show a tread pattern of a pneumatic tire constructed in accordance with a third embodiment of the second invention. The portions of the tread substantially identical in construction and operation to those of the first embodiment of the second invention are designated by like reference numerals for avoiding the description thereof, and the only necessary part will hereinafter be described.

In the third embodiment, a shoulder rib 3 arranged at the outermost end portion of the tread 1 is formed with a plurality of lug grooves 17 axially extending from the outer end of an outer rib portion 5 into an inner rib portion 6. A plurality of sipes 15 formed in the inner rib portion 6 comprises sipes having different lengths, the sipes of longer length being provided adjacent the axially extending lug grooves 17.

Figure 7A:
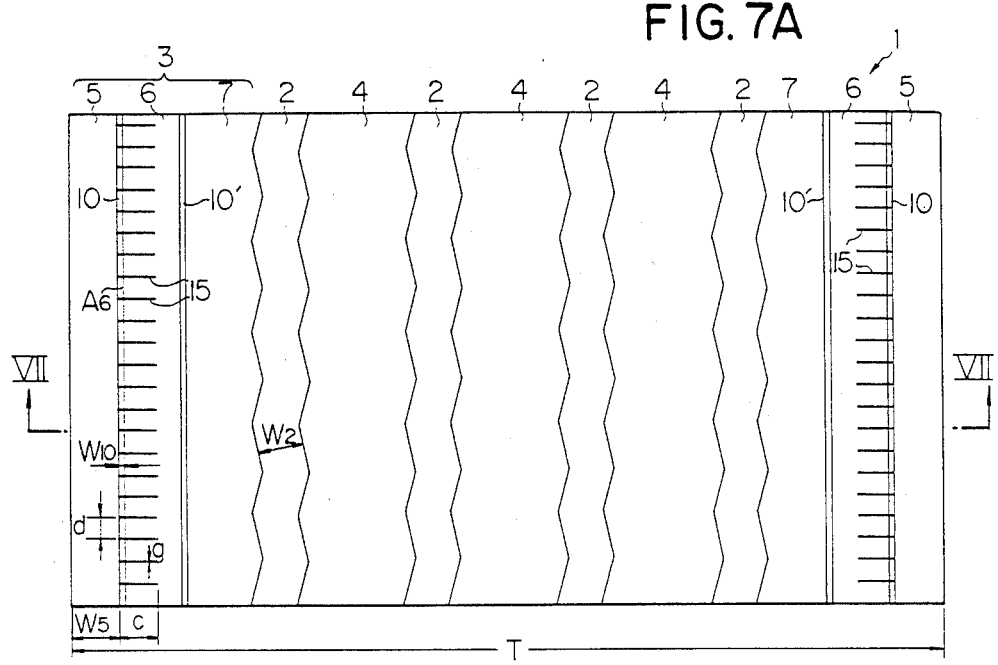
FIG. 7A is a part-plan view of the tread of a pneumatic radial tire according to a fourth embodiment of the second invention.
Figure 7B:
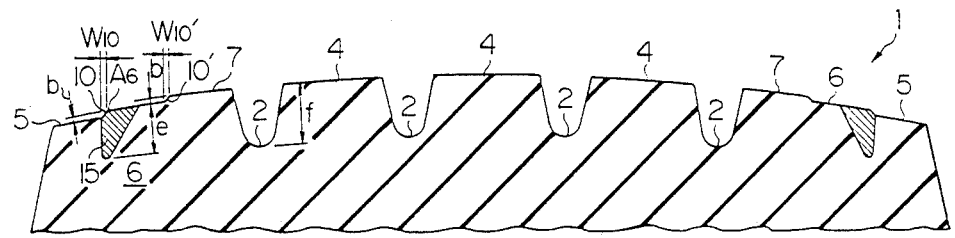
FIG. 7B is a cross sectional view of the tread substantially taken along line VII—VII indicated in FIG. 7A.

FIGS. 7A and 7B show a tread pattern of a pneumatic tire constructed in accordance with a fourth embodiment of the second invention. The portions of the tread substantially identical in construction and operation to those of the second embodiment of the first invention are designated by like reference numerals for avoiding the description thereof, and the only necessary part will hereinafter be described.

A shoulder rib portion 3 is axially divided into an outermost rib portion 5, an intermediate rib portion 6 and an innermost rib portion 7. For the purpose of effectively preventing the local wear occurred in the outmost rib portion 5 from extending to the intermediate and innermost rib portions 6 and 7, a plurality of sipes 15 are formed in the vicinity of an outer end $A_6$ of the intermediate rib portion 6 so that the rigidity of the outer end portion of the intermediate rib portion 6 is decreased. These sipes 15 are substantially identical in length l, depth e, space d and width g to those of the first embodiment of the second invention and therefore the description therefor will hereinafter be omitted by designating like reference numerals.

Figure 8A:
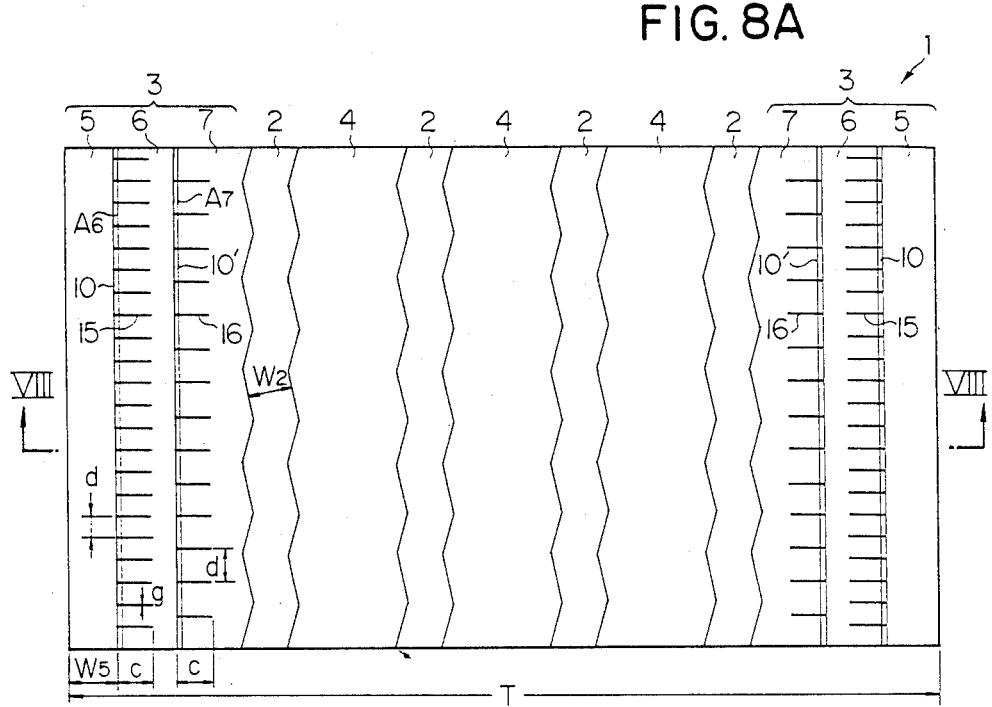
FIG. 8A is a part-plan view of the tread of a pneumatic radial tire according to one embodiment of a third invention.
Figure 8B:
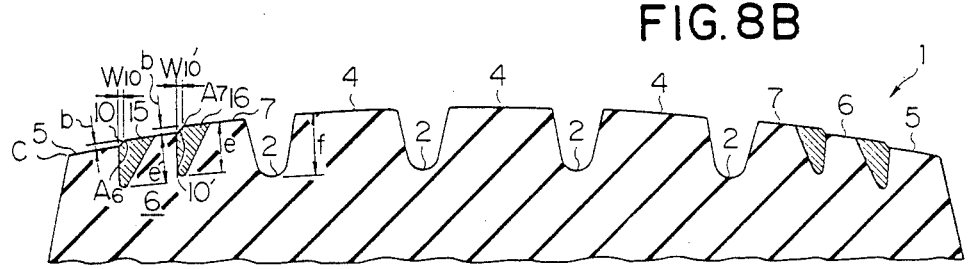
FIG. 8B is a cross sectional view of the tread substantially taken along line VIII—VIII indicated in FIG. 8A.

FIGS. 8A and 8B show a tread pattern of a pneumatic tire constructed in accordance with one embodiment of a third invention. The portions of the tread substantially identical in construction and operation to those of the first and second inventions are designated by like reference numerals for avoiding the description therefor, and the only necessary part will hereinafter be described.

In this embodiment of the third invention, a shoulder rib portion 3 arranged at an outermost end of a tread 1 is axially divided into an innermost rib portion 5, an intermediate rib portion 6 and an outermost rib portion 7 through two circumferentially extending sloped portions 10 and 10'. For the purpose of more effectively preventing local wear from axially inwardly extending, a first set of sipes or incisions 15 and a second set of sipes or incisions 16 are formed in the vicinities of outer ends $A_6$ and $A_7$ of at least two rib portions 6 and 7 other than the outermost rib portion 5 so that the rigidities of the outer end portions of the rib portions 6 and 7 are decreased. The first and second sets of sipe 15 and 16 are gradually reduced in quantity axially inwardly of the tread 1. The quantity of the sipes, that is the total of projected areas of the sipes on the radial plane per unit length in the circumferential direction of the tire, is gradually reduced axially inwardly. More particularly, the quantity of the sipes 16 arranged in the vicinity of the outer end $A_7$ of the innermost rib portion 7 arranged axially inwardly of the intermediate rib portion 6 is smaller that that of the sipes 15 arranged in the vicinity of the outer end $A_6$ of the intermediate rib portion 6. The reason is that the lateral force, which causes the uneven wear, is larger in the outside than in the inside.

In this embodiment, a length c, depth e, space d and depth g of the sipe 15 formed in the vicinity of the outer end $A_6$ of the rib portion 6 are respectively substantially identical to those of the fourth embodiment of the second invention.

In the embodiment of the third invention, the total of the projected areas of the sipes 15, arranged in the vicinity of the outer end $A_6$ of the rib portion 6, on the radial plane, is preferably from 30 to 600 mm$^2$ per unit length (which will hereinafter be 1 cm) in the circumferential direction of the tire, more preferably from 60 to 400 mm$^2$. The ratio between totals of projected areas of the sipes on the radial planes between the rib portions 6 and 7 per unit length in the circumferential direction, that is, the ratio between the total of the projected areas of the sipes 15 and the total of the projected areas of the sipes 16 is preferably from 0.2 to 0.8, more preferably from 0.3 to 0.7.

In order that the quantity of the sipes arranged axially inwardly of the tread is smaller than that of the sipes arranged axially outwardly, the length c, depth e and circumferential space d of the sipe can be varied. For example, the first and second sets of sipes 15 and 16 may vary in length c, in depth e or in space d so as to be gradually reduced in quantity axially inwardly of the tread 1.

It should be noted that in the present invention the sipes may be provided in the vicinity of the shoulder end C of the tread. The shoulder end C may also be of so-called square shoulder type, round shoulder type and taper shoulder type. The tread width T is a width, measured axially of the tire, of the region of the tread contacted with the ground when the tire is operated under standard load of the tire. In the case of the tire with a so-called round shoulder, the tread width T is measured between opposite intersection points at which the extension lines of the outer surface of the tread and the extension lines of the opposite side walls of the tire intersect each other. In some cases, circumferentially extending narrow grooves or axially extending grooves may be formed within the shoulder rib. The present invention may also be applicable only to either half portion of the opposite portions of the tread divided by the mid-circumferential line of the tire.

The effect of the present invention will hereinafter be described in conjunction with tires of the following three kinds according to the present invention and a prior art tire.

All the tire sizes are a pneumatic radial tire of 10.00R20 14PR (internal pressure, 7.25 kg/cm$^2$) and the internal construction is substantially identical to that of a known pneumatic radial tire. The tested tires of the three kinds are a pneumatic radial tire Q of the first invention having a tread pattern as shown in FIGS. 2A and 2B, a pneumatic radial tire R of the second invention having a tread pattern as shown in FIGS. 7A and 7B, and a pneumatic radial tire S of the third invention having a tread pattern as shown in FIGS. 8A and 8B. The tires Q, R and S are common in the four main grooves 2 and the shoulder rib 3 comprising three rib portions 5, 6 and 7. The dimensions of the treads of the tires Q, R and S are shown in Table 1. On the other hand, the prior art tire P, as shown in FIGS. 9A and 9B, is substantially identical in construction except for the particular features residing in the present invention.

TABLE 1

|  | Prior art tire P | Tire Q according to the first invention | Tire R according to the second invention | Tire S according to the third invention |
| --- | --- | --- | --- | --- |
| Tread width T | 200 | 200 | 200 | 200 |
| Main groove 2 | | | | |
| width $W_2$ | 11 | 11 | 11 | 11 |
| depth f | 14 | 14 | 14 | 14 |
| Width $W_5$ of outermost rib portion 5 | — | 11 | 11 | 11 |
| Sloped portion 10, 10' | | | | |
| width $W_{10}$, $W_{10'}$ | — | each 1.5 | each 1.5 | each 1.5 |

TABLE 1-continued

|  | Prior art tire P | Tire Q according to the first invention | Tire R according to the second invention | Tire S according to the third invention |
|---|---|---|---|---|
| height b | — | each 1.5 | each 1.5 | each 1.5 |
| Sipe 15 |  |  |  |  |
| length c | — | — | 7 | 7 |
| depth e | — | — | 12.5 | 12.5 |
| space d | — | — | 6 | 6 |
| width g | — | — | 0.5 | 0.5 |
| Sipe 16 |  |  |  |  |
| length c | — | — | — | 7 |
| depth e | — | — | — | 12.5 |
| space d | — | — | — | 9 |
| width g | — | — | — | 0.5 |

(Unit; mm)

The tires of the three kinds and the prior tire are employed in front wheels of the vehicle and are tested under condition of smooth surface roadway of 100%, average velocity of 60 km/hr, and standard load of JIS (Japanese Industrial Standard). The number of local wears, on the shoulder rib 3 according to the present invention and on the shoulder rib 103 of the prior art, which reached to the outermost main groove 2, is measured at a travelling distance of 50,000 km, and the maximum depth of the local wear is also measured. These test results are shown in Table 2 wherein the number of local wears and the maximum depth of the local wear of the prior art tire P are indicated as 100 by an index number, and the smaller value indicates the better performance of the tire.

It will be see from the test results shown in Table 2 that the tires Q, R and S constructed in accordance with the present invention are considerably reduced in number of the local wears and in maximum depth of the local wear. Thus, the occurrence and growth of the local wear are effectively prevented.

From the foregoing results, it will be seen that an improved pneumatic tire which can overcome the uneven wear on the shoulder rib and which considerably improves the life of the tire is afforded by the present design. While certain representative embodiments and details have been shown for the purpos of illustrating the subject matter of the present invention, it will be apparent to those skilled in this art that various changes and modification may be made therein without departing from the spirit or scope of the invention.

TABLE 2

|  | Prior art tire P | Tire Q according to the first invention | Tire R according to the second invention | Tire S according to the third invention |
|---|---|---|---|---|
| The number of local wears, on the shoulder rib 3 and on the shoulder rib 103, which reached to the outermost main groove 2 | 100 | 27 | 9 | 0 |
| The maximum depth of the local wear | 100 | 58 | 20 | 12 |

What is claimed is:

1. A pneumatic tire comprising a tread divided into at least three ribs by at least two main wide grooves substantially extending in a circumferential direction of said tire, wherein
   a shoulder rib of said ribs arranged at an outermost end portion of said tread is divided in an axial direction parallel to an axis of rotation of said tire into at least two rib portions; and
   between two adjacent rib portions of said rib portions, an inner end of an outer surface of an outer rib portion is connected through an outer surface of a circumferentially extending sloped portion to an outer end of an outer surface of an inner rib portion so that said inner end of said outer surface of said outer rib portion is lower than said outer end of said outer surface of said inner rib portion.

2. A pneumatic tire as set forth in claim 1 in which said at least two rib portions include an outermost rib portion having a width, measured in said axial direction, which is from 2 to 15% of a width of said tread.

3. A pneumatic tire as set forth in claim 1, in which said circumferentially extending sloped portion arranged between adjacent rib portions has a height, measured in a radial direction of said tire between outer and inner ends thereof, which is less than 4% of a tread width of said tread.

4. A pneumatic tire comprising a tread divided into at least three ribs by at least two main wide grooves substantially extending in a circumferential direction of said tire, wherein
   a shoulder rib of said ribs arranged at an outermost end portion of said tread which is divided in an axial direction parallel to an axis of rotation of said tire into at least two shoulder rib portions;
   between two adjacent shoulder rib portions of said shoulder rib portions, an inner end of an outer surface of an outer shoulder rib portion is connected through an outer surface of a circumferentially extending sloped portion to an outer end of an outer surface of an inner shoulder rib portion so that said inner end of said outer surface of said outer shoulder rib portion is lower than said outer end of said outer surface of said inner shoulder rib portion; and
   a plurality of sipes are formed in the vicinity of an outer end of at least one of said shoulder rib portions other than an outermost shoulder rib portion.

5. A pneumatic tire as set forth in claim 4, in which said outermost rib portion has a width, measured in said axial direction, which is from 2 to 15% of a width of said tread.

6. A pneumatic tire as set forth in claim 4, in which said circumferentially extending sloped portion arranged between adjacent rib portions has height, measured in a radial direction of said tire between outer and inner ends thereof, which is not more than 4% of a tread width of said tread.

7. A pneumatic tire as set forth in claim 4, in which said sipes are at least formed in the vicinity of an outer end of a second rib portion from an outermost rib portion of said at least two rib portions.

8. A pneumatic tire as set forth in claim 4, in which said sipes are circumferentially spaced apart a predetermined space from one another and substantially extend in said axial direction.

9. A pneumatic tire as set forth in claim 4, in which each sipe has a length, measured in said axial direction, which is not less than 1% of a width of said tread.

10. A pneumatic tire as set forth in claim 4, in which each sipe has a depth which is from 40 to 100% of a depth of an outermost main groove of said main grooves.

11. A pneumatic tire as set forth in claim 8, in which said predetermined space is from 2 to 10% of a width of said tread.

12. A pneumatic tire comprising a tread divided into at least three ribs by at least two main wide grooves substantially extending in a circumferential direction of said tire, wherein
- a shoulder rib of said ribs arranged at an outermost end portion of said tread is divided in an axial direction parallel to an axis of rotation of said tire into at least three shoulder rib portions;
- between two adjacent rib portions of said shoulder rib portions, an inner end of an outer surface of an outer shoulder rib portion is connected through an outer surface of a circumferentially extending sloped portion to an outer end of an outer surface of the inner shoulder rib portion so that said inner end of said outer surface of the outer shoulder rib portion is lower than said outer end of said outer surface of said inner shoulder rib portion; and
- a plurality of sipes are formed in the vicinities of outer ends of at least two of said shoulder rib portions other than an outermost shoulder rib portion, said sipes being gradually reduced in quantity axially inwardly of said tread.

13. A pneumatic tire as set forth in claim 12, in which said outermost rib portion has a width, measured in said axial direction, which is from 2 to 15% of a width of said tread.

14. A pneumatic tire as set forth in claim 12, in which said circumferentially extending sloped portion arranged between adjacent rib portions has a height, measured in a radial direction of said tire between outer and inner ends thereof, which is not more than 4% of a tread width of said tread.

15. A pneumatic tire as set forth in claim 12, in which said sipes are at least formed in the vicinity of an outer end of a second rib portion from an outermost rib portion of said at least three rib portions.

16. A pneumatic tire as set forth in claim 12, in which said sipes are circumferentially spaced apart a predetermined space from one another and substantially extend in said axial direction.

17. A pneumatic tire as set forth in claim 12, in which a ratio between totals of projected areas of said sipes on the radial planes per unit length in said circumferential direction between two adjacent rib portions, is from 0.2 to 0.8.

18. A pneumatic tire as set forth in claim 12, in which said sipes vary in length so as to gradually reduce the quantity of siping axrally inwardly of said tread.

19. A pneumatic tire as set forth in claim 17, in which said sipes vary in length so as to be gradually reduce the quantity of siping axially inwardly of said tread.

20. A pneumatic tire as set forth in claim 12, in which said sipes vary in depth so as to be gradually reduce the quantity of siping axially inwardly of said tread.

21. A pneumatic tire as set forth in claim 17, in which said sipes vary in depth so as to be gradually reduce the quantity of siping axially inwardly of said tread.

22. A pneumatic tire as set forth in claim 12, in which the circumferential spacing of said sipes varies so as to gradually reduce the quantity of siping axially inwardly of said tread.

23. A pneumatic tire as set forth in claim 17, in which the circumferential spacing of said sipes varies so as to gradually reduce the quantity of siping axially inwardly of said tread.

* * * * *